(12) United States Patent
Huennekes et al.

(10) Patent No.: US 8,776,499 B2
(45) Date of Patent: Jul. 15, 2014

(54) EMISSION TREATMENT SYSTEMS AND METHODS USING PASSIVATED SURFACES

(75) Inventors: Edgar V. Huennekes, Wunstorf (DE); Martin Kalwei, Hannover (DE)

(73) Assignee: BASF Corporation, Florham Park, NJ (US)

( * ) Notice: Subject to any disclaimer, the term of this patent is extended or adjusted under 35 U.S.C. 154(b) by 863 days.

(21) Appl. No.: 12/391,812

(22) Filed: Feb. 24, 2009

(65) Prior Publication Data

US 2009/0211232 A1 Aug. 27, 2009

Related U.S. Application Data

(60) Provisional application No. 61/031,170, filed on Feb. 25, 2008.

(51) Int. Cl.
  *F01N 3/00* (2006.01)
(52) U.S. Cl.
  USPC .......... 60/286; 60/295; 60/297; 60/301; 60/303
(58) Field of Classification Search
  USPC ............ 60/321–324, 286, 295, 303, 301
  See application file for complete search history.

(56) References Cited

U.S. PATENT DOCUMENTS

| | | | |
|---|---|---|---|
| 3,163,251 A * | 12/1964 | Rees | 180/309 |
| 3,826,815 A | 7/1974 | Mavrovic | |
| 4,021,372 A | 5/1977 | Meguerian et al. | |
| 4,087,513 A | 5/1978 | Schell | |
| 4,168,299 A | 9/1979 | Schell | |
| 4,285,838 A | 8/1981 | Ishida et al. | |
| 4,318,894 A | 3/1982 | Hensel et al. | |
| 4,353,208 A | 10/1982 | Vokler et al. | |
| 4,518,429 A * | 5/1985 | Drake et al. | 106/14.39 |
| 4,842,834 A | 6/1989 | Burton | |
| 5,157,010 A | 10/1992 | Maus et al. | |
| 5,281,403 A | 1/1994 | Jones | |
| 5,431,893 A | 7/1995 | Hug et al. | |
| 5,497,617 A | 3/1996 | Bagley et al. | |
| 5,601,792 A | 2/1997 | Hug et al. | |
| 5,968,464 A | 10/1999 | Peter-Hoblyn et al. | |
| 5,976,475 A | 11/1999 | Peter-Hoblyn et al. | |
| 6,074,619 A | 6/2000 | Schoubye | |

(Continued)

FOREIGN PATENT DOCUMENTS

| DE | 19646643 C1 | 2/1998 |
|---|---|---|
| DE | 102004010496 A1 | 9/2005 |

(Continued)

OTHER PUBLICATIONS

Piazzesi, Gaia et al., "Influence of NO2 on the Hydrolysis of Isocyanic Acid Over TiO2", *Applied Catalysis B: Environmental 65*, (2006), 169-174 pp.

(Continued)

*Primary Examiner* — Binh Q Tran
(74) *Attorney, Agent, or Firm* — Melanie L. Brown; Servilla Whitney (57) ABSTRACT

Provided are exhaust systems, components, and catalytic articles that have been passivated for use in conjunction with diesel engines that includes a NOx abatement system that uses a reductant. These items are passivated in order to minimize degradation of a reductant in their presence when, for example, they have been subjected to temperatures in excess of 650° C.

13 Claims, 4 Drawing Sheets

(56) References Cited

U.S. PATENT DOCUMENTS

| | | | |
|---|---|---|---|
| 6,267,307 B1 * | 7/2001 | Pontoppidan | 239/585.4 |
| 6,928,807 B2 | 8/2005 | Jacob et al. | |
| 7,490,464 B2 * | 2/2009 | Li et al. | 60/295 |
| 2006/0083675 A1 * | 4/2006 | Daly et al. | 423/651 |
| 2008/0292519 A1 * | 11/2008 | Caudle et al. | 423/237 |

FOREIGN PATENT DOCUMENTS

| | | |
|---|---|---|
| EP | 0487886 | 6/1992 |
| EP | 0555746 | 8/1993 |
| EP | 1022048 | 7/2000 |
| EP | 1052009 | 11/2000 |
| EP | 1832345 A1 | 9/2007 |

OTHER PUBLICATIONS

Koebel, Manfred et al., "Thermal and Hydrolytic Decomposition of Urea for Automotive Selective Catalytic Reduction Systems: Thermochemical and Practical Aspects", *Ind. Eng. Chem. Res. 42*, (2003), 2093-2100 pp.

PCT International Search Report and Written Opinion in PCT/US2009/035102, (Aug. 18, 2009), 15 pgs.

* cited by examiner

EMISSION TREATMENT SYSTEMS AND METHODS USING PASSIVATED SURFACES

CROSS REFERENCE OF RELATED APPLICATION

This application claims the benefit of priority under 35 U.S.C. §119(e) to U.S. Patent Application No. 61/031,170, filed Feb. 25, 2008, which is hereby incorporated by reference in its entirety.

TECHNICAL FIELD

This invention pertains generally to emission treatment systems that use NOx abatement with a reductant, for example, Selective Catalytic Reduction (SCR). More specifically, this invention is directed to emission treatment systems having metal parts treated with metal passivators and/or oxidation inhibitors in order to inhibit reductant decomposition and oxidation on metal surfaces, and methods for their use and manufacture.

BACKGROUND

Emissions standards throughout the world seek to reduce $NO_x$ emissions from automobile emissions, for example, from diesel exhausts. Treatment of $NO_x$ can be achieved by the use of a NOx abatement technology such as a lean NOx trap or Selective Catalytic Reduction (SCR) using a reductant. In SCR, a reductant such as hydrocarbon, ammonia or urea-based reagents are used in the presence of a catalyst having a base metal where the reductant reacts to reduce the oxides of nitrogen. The reductant is typically provided by an injector upstream of the SCR catalyst. For systems that use ammonia or ammonia precursors, the use of urea is desirable because it is safer to handle and store compared to the use of ammonia directly. In order to use urea as an ammonia precursor, conditions that promote urea's decomposition into $NH_3$, $CO_2$, and $H_2O$ are needed. There are many ways urea can be provided to an SCR of a diesel exhaust system, including those set out in, for example, U.S. Pat. No. 5,601,792 (Hug) and U.S. Pat. No. 5,968,464 (Peter-Hoblyn). In U.S. Pat. No. 6,074,619 (Schoubye), droplets of reductant are provided in an exhaust gas that passes through a series of stacks of parallel plates. The plates of Schoubye can be coated with materials such as oxides of Al, Fe, Ti, Zr, Si, Zn, or Mg to catalyze the decomposition of urea. Further treatment of diesel exhaust emissions include the use of soot filters, a process which requires periodic regeneration of the filter to burn. During regeneration, the steel components of the exhaust system, for example, the exhaust manifold, the exhaust conduit, the ammonia or urea injector, and/or the SCR catalyst, can be subjected to temperatures in excess of 600° C. Other operating conditions, such as heavy loads exerted on the engine at high altitudes, can also result in temperatures in excess of 500° C. in the exhaust system.

Such thermal conditions can activate the metal/steel surfaces of the exhaust system to make them promote oxidation reactions. This causes ammonia intended for use with SCR to degrade. For example, oxides of the steel components, such as chromium (Cr), manganese (Mn), and nickel (Ni) can oxidize ammonia which leads to a change in stoichiometry in the SCR catalyst.

There is a need, therefore, to inhibit reductant decomposition and oxidation in emission systems that utilize NOx abatement catalysts.

SUMMARY

Systems and methods are provided that inhibit reductant decompositions and oxidation in emission systems that utilize NOx abatement catalysts. In one or more embodiments, metal parts selected from one or more of an exhaust conduit, a manifold, a catalyst substrate, a mixer, a flow straightener, and a flow control device are passivated to inhibit oxidation reactions in the exhaust system.

In a first embodiment, a system for treatment of an engine exhaust stream including nitrogen oxides and other exhaust gas components is provided, the system comprising an exhaust conduit in fluid communication with the engine via an exhaust manifold; an injector in fluid communication with the manifold and the conduit, the injector being coupled to reductant source and to periodically meter the ammonia or ammonia precursor into the system such that the ammonia or ammonia precursor contacts the manifold and the conduit; and a catalyst composition on a substrate in fluid communication with and downstream of the injector, the catalyst composition to promote a reaction between the reductant and at least one of the exhaust gas components, wherein one or both of the conduit and the manifold is passivated to minimize reaction of one or both of the manifold and the conduit with the reductant. In one system embodiment, the system further include a metal part selected from one or more of a catalyst substrate, a mixer, a flow straightener, and a flow control device, the metal part being passivated.

In a second embodiment, one or both of the conduit and the manifold are passivated with a component that inhibits oxidation reactions. Examples of suitable components include an oxide of aluminum, iron, titanium, zirconia, silicon, zinc, or combinations thereof. In one embodiment, the component comprises an oxide of phosphorous. In one embodiment, at least a portion of the injector is passivated with a component that inhibits oxidation reactions.

Another aspect of the invention pertains to an NOx abatement catalyst article comprising a catalyst composition deposited on a passivated metal substrate, the catalyst composition comprising a catalyst effective to substantially abate nitrogen oxides (NOx) in the presence of a reductant when placed in an exhaust gas stream. In one embodiment of the catalyst article, the metal substrate is passivated with a component that inhibits oxidation reactions. According to another article embodiment, the component comprises a sulfate, an oxide of aluminum, iron, titanium, zirconia, silicon, zinc, or combinations thereof. In yet another article embodiment, the component comprises an oxide of phosphorous. In another article embodiment, a first layer including the component that inhibits oxidation reactions is located on the metal substrate and a second layer including the zeolite and the base metal component is located on the first layer.

Another aspect of the invention pertains to a system for treatment of an engine exhaust stream including nitrogen oxides and other exhaust gas components, the emission treatment system comprising: an exhaust conduit in fluid communication with the engine via an exhaust manifold; an injector in fluid communication with the exhaust conduit; a source of a reductant that is in fluid communication with the injector such that conduit is exposed to the reductant; a catalyst composition on a substrate in fluid communication with, and downstream of the injector, the catalyst composition to promote a reaction between the reductant and at least one of the exhaust gas components; and a passivator coating located on a surface of at least one of the following: the exhaust conduit, the injector, or the substrate. In one system embodiment, the passivator coating comprises a component that inhibits oxidation reactions. Examples of such components include an oxide of aluminum, iron, titanium, zirconia, silicon, zinc, or combinations thereof. In other embodiments, the component comprises an oxide of phosphorous.

Another aspect of the invention pertains to a method of making a system for treatment of an engine exhaust stream including nitrogen oxides and other exhaust gas components, the method comprising providing an exhaust conduit in fluid communication with the engine via an exhaust manifold; providing an injector in fluid communication with the manifold and the conduit, the injector being coupled to a reductant source and to periodically meter the reductant into the system such that the reductant contacts the manifold and the conduit; providing a catalyst composition on a substrate in fluid communication with and downstream of the injector, the catalyst composition to promote a reaction between the reductant and at least one of the exhaust gas components; and passivating a surface of the manifold, the conduit, the injector, the substrate, or combinations thereof to minimize reaction of the manifold, the conduit, the injector, the substrate, or combinations thereof with the reductant.

In one method embodiment, the passivating step includes applying a component that inhibits oxidation reactions to the manifold, the conduit, the substrate, or combinations thereof to form a passivator coating. In at least one method embodiment, the step of applying the component includes electric arc spraying, plasma treating, CVD treatment, or electroplating.

Another aspect of the invention pertains to a method of treating a gaseous exhaust stream of a diesel engine, the exhaust stream including nitrogen oxides and other exhaust gas components, the method comprising: flowing the gaseous stream through an exhaust manifold and into an exhaust conduit and past an injector that periodically meters a reductant; contacting the gaseous stream and the ammonia or ammonia precursor with a catalyst composition on a substrate, the catalyst composition to promote a reaction between the reductant and at least one of the exhaust gas components, wherein a surface of the manifold, the conduit, the injector, the substrate or combinations thereof is passivated to minimize reaction of the manifold, the conduit, the injector, the substrate, or combinations thereof with the reductant. In one embodiment, of the method, the temperature of the gaseous stream is at a temperature of 650° C. or more.

DETAILED DESCRIPTION

Provided are exhaust systems, components, and catalytic articles that have been passivated for use in conjunction with diesel engines that use NOx abatement technology. These items are passivated in order to minimize degradation of ammonia in their presence when, for example, they have been subjected to temperatures in excess of 650° C. One example of a passivator is an oxide of phosphorous, specifically $P_2O_5$. Other suitable passivators include oxides of aluminum, iron, titanium, zirconia, silicon, zinc, or combinations thereof. In one or more embodiments, a passivator coating is provided where an amount of passivator present is sufficient to inhibit oxidation of ammonia reductant. Components of the system that can be passivated include, but are not limited to the exhaust manifold, the exhaust conduit, metallic parts of the injector, and a metal substrate used for the SCR catalyst composition.

Reference to passivate means treating or coating a surface, such as a metal surface, to reduce its reactivity. A passivator is a material that is used to passivate a surface against unwanted reactions, for example, a passivator may inhibit oxidation reactions. As used herein, the term "abate" means to decrease in amount and "abatement" means a decrease in the amount, caused by any means. Where they appear herein, the terms "exhaust stream" and "engine exhaust stream" refer to the engine out effluent as well as to the effluent downstream of one or more other catalyst system components including but not limited to a diesel oxidation catalyst and/or soot filter.

As used herein, according to at least one embodiment, the terms passivate and passivation refer to a very specific state of a metal surface characterized by a very thin (10's of atoms thick) layer of oxygen or other anions that act to prevent further reaction between the metal surface and the oxidizing environment. In one or more embodiments, the terms passivation and passivate refer to altering a surface of a metal part to reduce or inhibit the ability of the surface to act as an oxidation catalyst.

Before describing several exemplary embodiments of the invention, it is to be understood that the invention is not limited to the details of construction or process steps set forth in the following description. The invention is capable of other embodiments and of being practiced or being carried out in various ways.

Figure 1:
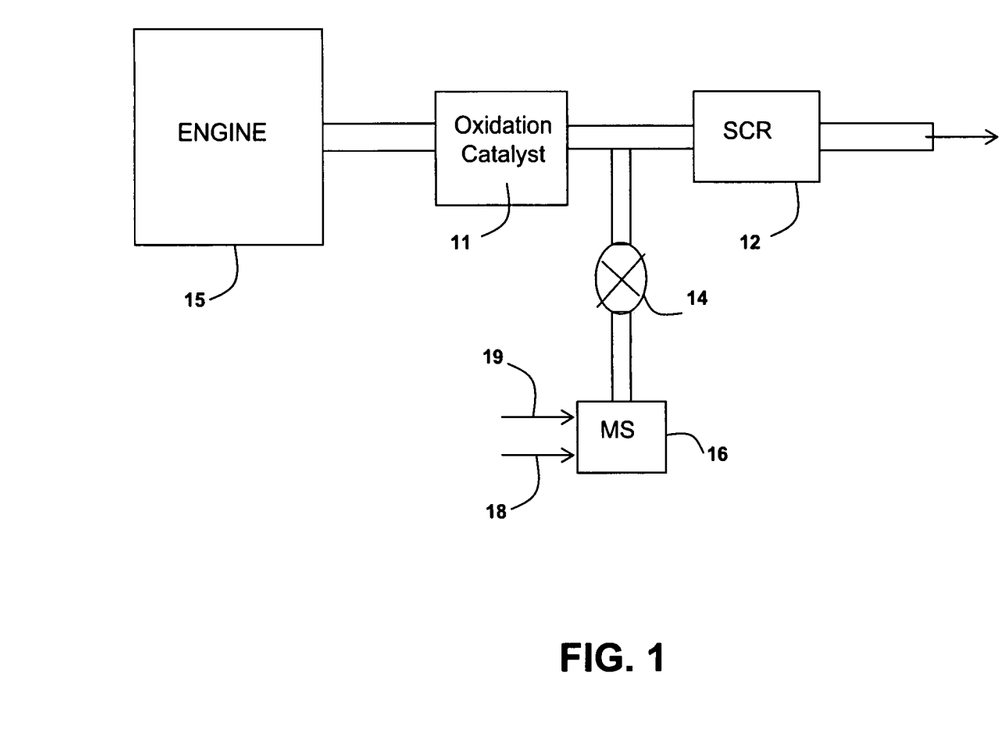
FIG. 1 is a schematic view showing an embodiment of an emission treatment system according to an embodiment that includes a urea reservoir and injector.

Turning to FIG. 1, exhaust from a diesel engine containing gaseous pollutants (including unburned hydrocarbons, carbon monoxide and NOx) and particulate matter is conveyed from the engine 15 to an oxidation catalyst 11. In the oxidation catalyst 11, unburned gaseous and non-volatile hydrocarbons (i.e., the VOF) and carbon monoxide are largely combusted to form carbon dioxide and water. Removal of substantial proportions of the VOF using the oxidation catalyst, in particular, helps prevent too great a deposition of particulate matter on the soot filter (not shown), which is positioned downstream in the system. A substantial proportion of the NO of the $NO_x$ component is oxidized to $NO_2$ in the oxidation catalyst.

Downstream of the oxidation catalyst a reductant, for example, a hydrocarbon, hydrogen, ammonia or an ammonia precursor, is injected as a spray via a nozzle (not shown) into the exhaust stream. In ammonia-based systems, an aqueous urea source 18 can serve as the ammonia precursor which can be mixed with air 19 in a urea injector/mixing station 16. Valve 14 can be used to meter precise amounts of aqueous urea which are converted in the exhaust stream to ammonia. The exhaust stream with the added ammonia is conveyed to the catalyst 12 on a first substrate. The $NO_x$ components are then abated through one or more reactions of the exhaust gas components with the reductant.

It will be understood that the configuration shown in FIG. 1 is just one example of a system configuration, and the invention can include systems with other system configurations. An alternative embodiment of the emissions treatment system, (not shown) a second substrate is interposed between the $NH_3$ injector and the first substrate. In this embodiment, the second substrate is coated with NOx abatement catalyst composition which may be the same composition as is used to coat the first substrate or a different composition. An advantageous feature of this embodiment is that the NOx abatement catalyst compositions that are used to coat the substrate can be selected to optimize NOx conversion for the operating conditions characteristic of that site along the exhaust system. For example, the second substrate can be coated with an SCR catalyst composition that is better suited for higher operating temperatures experienced in upstream segments of the exhaust system, while another SCR composition can be used to coat the first substrate (i.e., the inlet zone of the first substrate) that is better suited to cooler exhaust temperature which are experienced in downstream segments of the exhaust system.

The second substrate can either be a honeycomb flow through substrate, an open cell foam substrate or a honeycomb wall flow substrate. In configurations of this embodiment where the second substrate is a wall flow substrate or a high efficiency open cell foam filter, the system can remove greater than 80% of the particulate matter including the soot fraction and the SOF. An SCR-coated wall flow substrate and its utility in the reduction of NOx and particulate matter have been described, for instance, in co-pending U.S. Pat. No. 7,229,597, the entire disclosure of which is hereby incorporated by reference.

In some applications, it may be advantageous to include an oxidation catalyst upstream of the site of ammonia/ammonia precursor injection. In such an arrangement (not shown), the exhaust stream is first conveyed to the catalyst substrate 34 where at least some of the gaseous hydrocarbons, CO and particulate matter are combusted to innocuous components. In addition, a significant fraction of the NO of the NOx component of the exhaust is converted to $NO_2$. Higher proportions of $NO_2$ in the NOx component facilitate the reduction of NOx to $N_2$ and $H_2O$ on the SCR catalyst(s) located downstream. It will be appreciated that in this arrangement, the first substrate could be a catalyzed soot filter, and the SCR catalyst could be disposed on the catalyzed soot filter. In an alternative embodiment, the second substrate comprising an SCR catalyst may be located upstream from catalyst substrate.

In other embodiments, other forms of NOx abatement could be utilized. In some embodiments, an SCR system could be located downstream of a three way catalyst or downstream of a lean NOx trap catalyst. In these applications, the upper temperature of the limit may be above about 800° C., for example up to 1000° C. In still other embodiments, an SCR catalyst can be on a wall-flow or other type of filter. In one or more embodiments, an oxidation catalyst may be located upstream of the SCR catalyst. In other embodiments, an ammonia oxidation (AMOX) catalyst is located downstream from the NOx abatement catalyst.

Figure 2:
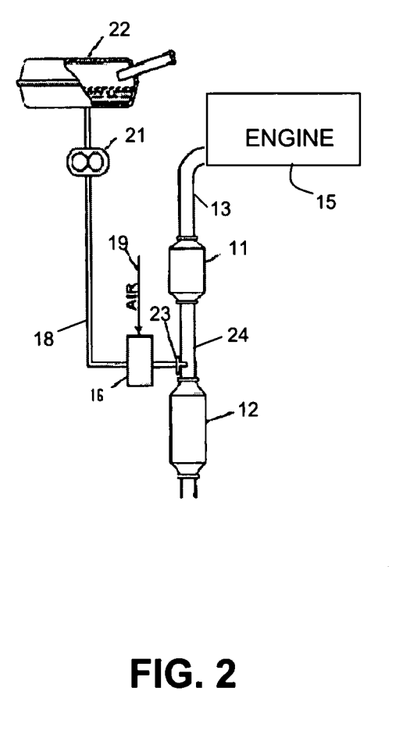
FIG. 2 is a schematic view showing an integrated engine emission treatment system according to an embodiment of the present invention.

In FIG. 2, engine 15 is connected to the oxidation catalyst 11 via an exhaust manifold 13. A reductant reservoir 22, which in the embodiment shown is an aqueous urea reservoir which stores a urea/water solution aboard the vehicle which is pumped through a pump 21 including a filter and pressure regulator to a urea injector/mixing station 16. Urea injector 16 is a mixing chamber which receives pressure regulated air on line 19 which is pulsed by a control valve to urea injector 16. An atomized urea/water/air solution results which is pulse injected through a nozzle 23 into exhaust conduit 24 upstream of the SCR catalyst 12.

Substrates

Reference to substrates means a material that is suitable for retaining a catalyst thereon. In specific embodiments, a metal substrate, such as a corrugated metal carrier, is used.

With reference to a substrate, a useful substrate may be metallic in nature and be composed of one or more metals or metal alloys. The metallic carriers may be employed in various shapes such as corrugated sheet or monolithic form. Specific metallic supports include the heat resistant metals and metal alloys such as titanium and stainless steel as well as other alloys in which iron is a substantial or major component. Such alloys may contain one or more of nickel, chromium and/or aluminum, and the total amount of these metals may advantageously comprise at least 15 wt % of the alloy, e.g., 10-25 wt % of chromium, 3-8 wt % of aluminum and up to 20 wt % of nickel. The alloys may also contain small or trace amounts of one or more other metals such as manganese, copper, vanadium, titanium and the like. The surface of the metal carriers may be oxidized at high temperatures, e.g., 1000° C. and higher, to improve the resistance to corrosion of the alloys by forming an oxide layer on the surfaces of the carriers. Such high temperature-induced oxidation may enhance adherence of a catalytic material to the carrier.

Figure 3A:
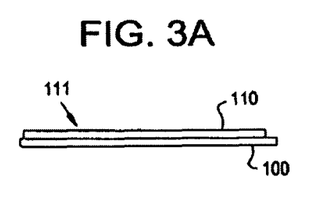
FIG. 3A is a schematic cross-sectional view of a metal substrate having an passivator coating deposited thereon according to one embodiment of the present invention.
Figure 3B:
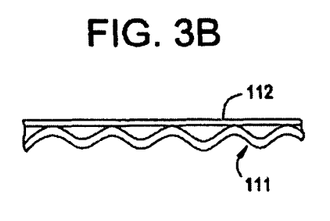
FIG. 3B is a schematic cross-sectional view of the substrate of FIG. 3A after processing into a corrugated configuration and being disposed upon another coated substrate.
Figure 3C:
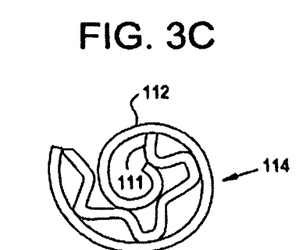
FIG. 3C is a schematic cross-sectional view of the substrates of FIG. 3B after further processing to wind the substrates to form a honeycomb.
Figure 4:
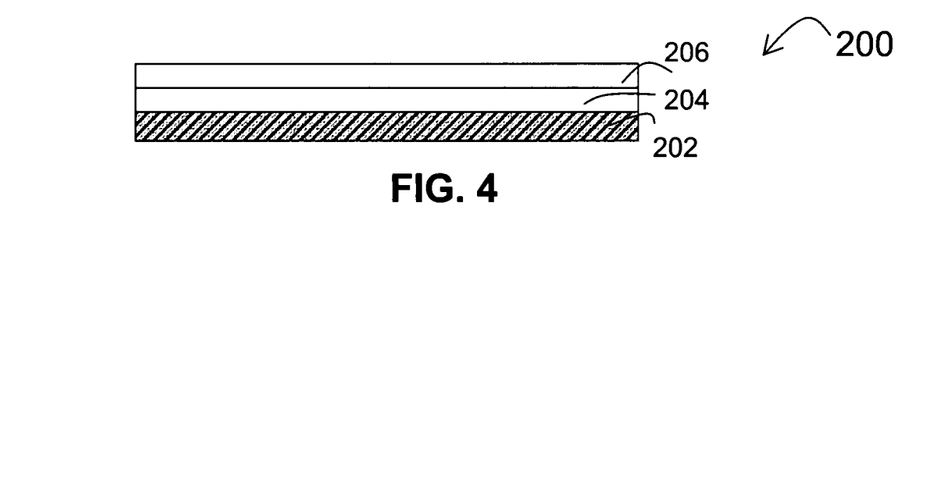
FIG. 4 is schematic view showing an SCR catalyst located on a metal substrate having a passivator coating.

A metal substrate 100, seen in FIG. 3A, has been passivated by applying a coating 110 having a component that inhibits reactions of surface oxides formed when steel is exposed to high temperatures, such as in excess of 500° C. (or of 600° C., or of 700° C., or even of 800° C.). Such components include, but are not limited to oxides of P, Al, Fe, Ti, Zr, Si, Zn, or Mg. A specific passivator is $P_2O_5$. The passivated substrate 111 may then be corrugated and placed against a second, optionally passivated substrate 112, as shown in FIG. 3B. The two substrates may be further processed by coiling them together as shown FIG. 3C to compose a carrier 114 for SCR catalytic material to be deposited thereon. FIG. 4 shows an SCR catalyst 200 comprising a metal substrate 202 having a passivator coating 204 upon which an SCR catalyst composition 206 has been deposited. In other embodiments, the passivator material can be integrated into the SCR catalyst composition in the form of a washcoat.

Other suitable passivators include glasses and silica. Borosilicate glass is an example of one type of passivator glass. Another potential passivator material is titania. Certain materials such as titania have phases such as rutile that are more suitable for suppressing oxidation. Another means of suppressing oxidation in the systems and methods is by sulfation, which can be achieved by added sulfates or by exposing the surfaces of the system to sulfur-containing gases. In embodiments that include washcoats, the surface area of the support particles are low, for example, less than about 20 $m^2/g$, and in particular embodiments, less than 5 $m^2/g$. Another example of a material that has a particularly suitable phase for suppressing oxidation is the alpha phase of alumina. In other embodiments, thermal barrier coatings such as $ZrO_2$ may be utilized. In still other embodiments, aluminum metal is oxided to $Al_2O_3$ during service to suppress oxidation. Other variants are within the scope of the invention.

Deposition of the passivator material onto the metal substrate can be done by methods known in the art, for example, electric arc spraying, plasma treating, CVD treatment, or electroplating. A specific method of electric arc spraying is provided in U.S. Patent Publ. No. 2003/0165414 (Galligan).

SCR Catalysts

Suitable SCR catalyst compositions are described, for instance, in U.S. Pat. No. 4,961,917 (Byrne) and U.S. Pat. No. 5,516,497 (Speronello), which are both hereby incorporated by reference in their entirety. Compositions disclosed in the Byrne patent include one or both of an iron and a copper promoter present in a zeolite in an amount of from about 0.1 to 30 percent by weight, preferably from about 1 to 5 percent by weight, of the total weight of promoter plus zeolite. In addition to their ability to catalyze the reduction of $NO_x$ with $NH_3$ to $N_2$, the disclosed compositions can also promote the oxidation of excess $NH_3$ with $O_2$, especially for those compositions having higher promoter concentrations.

Specific SCR catalyst compositions used in the inventive system have thermal resistance to temperatures greater than 650° C. Such high temperatures are often encountered during the regeneration of soot filters. Additionally, SCR catalyst compositions should resist degradation upon exposure to sulfur components, which are often present in diesel exhaust gas compositions.

Zeolites used in such compositions are resistant to sulfur poisoning, sustain a high level of activity for the SCR process, and are capable of oxidation of excess ammonia with oxygen. These zeolites have pore size large enough to permit adequate movement of the reactant molecules NO and $NH_3$ in to, and the product molecules $N_2$ and $H_2O$ out of, the pore system in the presence of sulfur oxide molecules resulting from short term sulfur poisoning, and/or sulfate deposits resulting from long term sulfur poisoning. Specific zeolites include, but are not limited to, USY, Beta and ZSM-20.

An exemplary SCR catalyst composition contains a zeolite and base metal component selected from one or more of a copper and iron component. In a specific embodiment, the base metal component is a copper component. Specific zeolites of the SCR catalyst composition have a silica to alumina ratio of at least about 10. For instance, a beta zeolite can be used in the SCR catalyst composition. SCR catalyst compositions can be deposited at a concentration of at least 1.3 $g/in^3$ to ensure that the desired NOx reduction are achieved and to secure adequate durability of the catalyst over extended use. In a specific embodiment, there is at least 1.6 $g/in^3$ of SCR catalyst, and in particular, 1.6 to 2.4 $g/in^3$ deposited on the substrate.

Before describing several exemplary embodiments of the invention, it is to be understood that the invention is not limited to the details of construction or process steps set forth in the following description. The invention is capable of other embodiments and of being practiced in various ways.

EXAMPLES

The following non-limiting examples shall serve to illustrate the various embodiments of the present invention. In each of the examples, the carrier was cordierite.

Example 1

An exhaust conduit is coated with a mixture of alumina and ammonia phosphate using electric arc spraying to passivate the conduit and form a passivator coating having a phosphorous oxide. The coated conduit does not degrade ammonia needed for SCR catalysis at temperatures in excess of 600° C.

Example 2

A metal substrate is coated with a mixture of alumina and ammonia phosphate using electric arc spraying to passivate the substrate and form a passivator coating having a phosphorous oxide. The coated substrate is then dipped into a washcoat comprising a beta zeolite and copper to provide a loading of 2.0 $g/in^3$.

Reference throughout this specification to "one embodiment," "certain embodiments," "one or more embodiments" or "an embodiment" means that a particular feature, structure, material, or characteristic described in connection with the embodiment is included in at least one embodiment of the invention. Thus, the appearances of the phrases such as "in one or more embodiments," "in certain embodiments," "in one embodiment" or "in an embodiment" in various places throughout this specification are not necessarily referring to the same embodiment of the invention. Furthermore, the particular features, structures, materials, or characteristics may be combined in any suitable manner in one or more embodiments.

The invention has been described with specific reference to the embodiments and modifications thereto described above. Further modifications and alterations may occur to others upon reading and understanding the specification. It is intended to include all such modifications and alterations insofar as they come within the scope of the invention.

What is claimed is:

1. A system for treatment of an engine exhaust stream including nitrogen oxides and other exhaust gas components, the system comprising:
    an exhaust conduit in fluid communication with the engine via an exhaust manifold;
    an injector in fluid communication with the manifold and the conduit, the injector being coupled to an ammonia or ammonia precursor source and to periodically meter the ammonia or ammonia precursor into the system such that the ammonia or ammonia precursor contacts the manifold and the conduit; and
    a selective catalytic reduction (SCR) catalyst composition on a metal substrate having an oxidized surface that resists corrosion in fluid communication with and downstream of the injector, the catalyst composition effective to promote a SCR reaction between the ammonia and the nitrogen oxides, wherein the substrate is passivated with a component that inhibits oxidation reactions to minimize reaction of the substrate with the ammonia so that the ammonia is not oxidized, wherein the component that inhibits oxidation comprises an oxide selected from the group consisting of an aluminum oxide, iron oxide, titanium oxide, zirconia oxide, silicon oxide, zinc oxide, and combinations thereof, and wherein the component that inhibits oxidation reactions is in a first layer located on the metal substrate and the SCR catalyst composition is in a second layer including a zeolite and a base metal component on the first layer.

2. The system of claim 1, wherein the component comprises an oxide of phosphorous.

3. The system of claim 1, wherein at least a portion of the injector is passivated with a component that inhibits oxidation reactions.

4. The system of claim 1, further comprising a metal part selected from one or more of a substrate having selective catalytic reduction (SCR) catalyst thereon, a mixer, a flow straightener, and a flow control device, the metal part being passivated.

5. The system of claim 4, wherein the metal part is passivated with a component that inhibits oxidation reactions with ammonia.

6. The system of claim 5, wherein the component comprises a sulfate, an oxide selected from the group consisting of an aluminum oxide, iron oxide, titanium oxide, zirconia oxide, silicon oxide, zinc oxide, and combinations thereof.

7. The system of claim 5, wherein the component comprises an oxide of phosphorous.

8. The system of claim 1, further comprising a passivator coating located on a surface of at least one of the exhaust conduit, and the injector, the passivator coating comprising a component that inhibits oxidation reactions.

9. The system of claim 8, wherein the component comprises an oxide selected from the group consisting of an aluminum oxide, iron oxide, titanium oxide, zirconia oxide, silicon oxide, zinc oxide, and combinations thereof.

10. The system of claim 8, wherein the component comprises an oxide of phosphorous.

11. A method of making a system for treatment of an engine exhaust stream including nitrogen oxides and other exhaust gas components, the method comprising:
   providing an exhaust conduit in fluid communication with the engine via an exhaust manifold;
   providing an injector in fluid communication with the manifold and the conduit, the injector being coupled to an ammonia source and to periodically meter the ammonia or an ammonia precursor into the system such that the ammonia contacts the manifold and the conduit;
   providing a selective catalytic reduction (SCR) catalyst composition on a metal substrate having an oxidized surface that resists corrosion in fluid communication with and downstream of the injector, the SCR catalyst composition effective to promote a reaction between the ammonia and the nitrogen oxides; and
   passivating the surface of the substrate, to minimize reaction of the substrate with the ammonia so that the ammonia, wherein the passivating step includes applying a component that inhibits oxidation reactions to the substrate to form a passivator coating through electric arc spraying, plasma treating, chemical vapor deposition (CVD) treatment, or electroplating, and wherein the component that inhibits oxidation reactions is in a first layer located on the metal substrate and the SCR catalyst composition is in a second layer including a zeolite and a base metal component on the first layer.

12. A method of treating a gaseous exhaust stream of a diesel engine, the exhaust stream including nitrogen oxides and other exhaust gas components, the method comprising:
   flowing the gaseous stream through an exhaust manifold and into an exhaust conduit and past an injector that periodically meters a reductant including ammonia;
   contacting the gaseous stream and the ammonia or ammonia precursor with a catalyst composition on a metal substrate having an oxidized surface that resists corrosion, the catalyst composition effective to promote a selective catalytic reduction (SCR) reaction between the reductant and the nitrogen oxides; and
   wherein the surface of the substrate is passivated with a component that inhibits oxidation reactions to minimize reaction of the substrate with the ammonia, so that the ammonia is not oxidized, wherein the component that inhibits oxidation comprises an oxide selected from the group consisting of an aluminum oxide, iron oxide, titanium oxide, zirconia oxide, silicon oxide, zinc oxide, and combinations thereof, and wherein the component that inhibits oxidation reactions is in a first layer located on the metal substrate and the catalyst composition is in a second layer including a zeolite and a base metal component on the first layer.

13. The method of claim 12, wherein a temperature of the gaseous stream is at a temperature of 650° C. or more.

\* \* \* \* \*